April 21, 1931.  C. E. CHALMERS  1,801,797
CHANGE MAKING MACHINE
Filed March 19, 1924   8 Sheets-Sheet 1

INVENTOR
Charles E. Chalmers
BY
ATTORNEYS

April 21, 1931. C. E. CHALMERS 1,801,797
CHANGE MAKING MACHINE
Filed March 19, 1924 8 Sheets-Sheet 2

INVENTOR
Charles E. Chalmers
BY
Bohleburo Ledbetter
ATTORNEYS

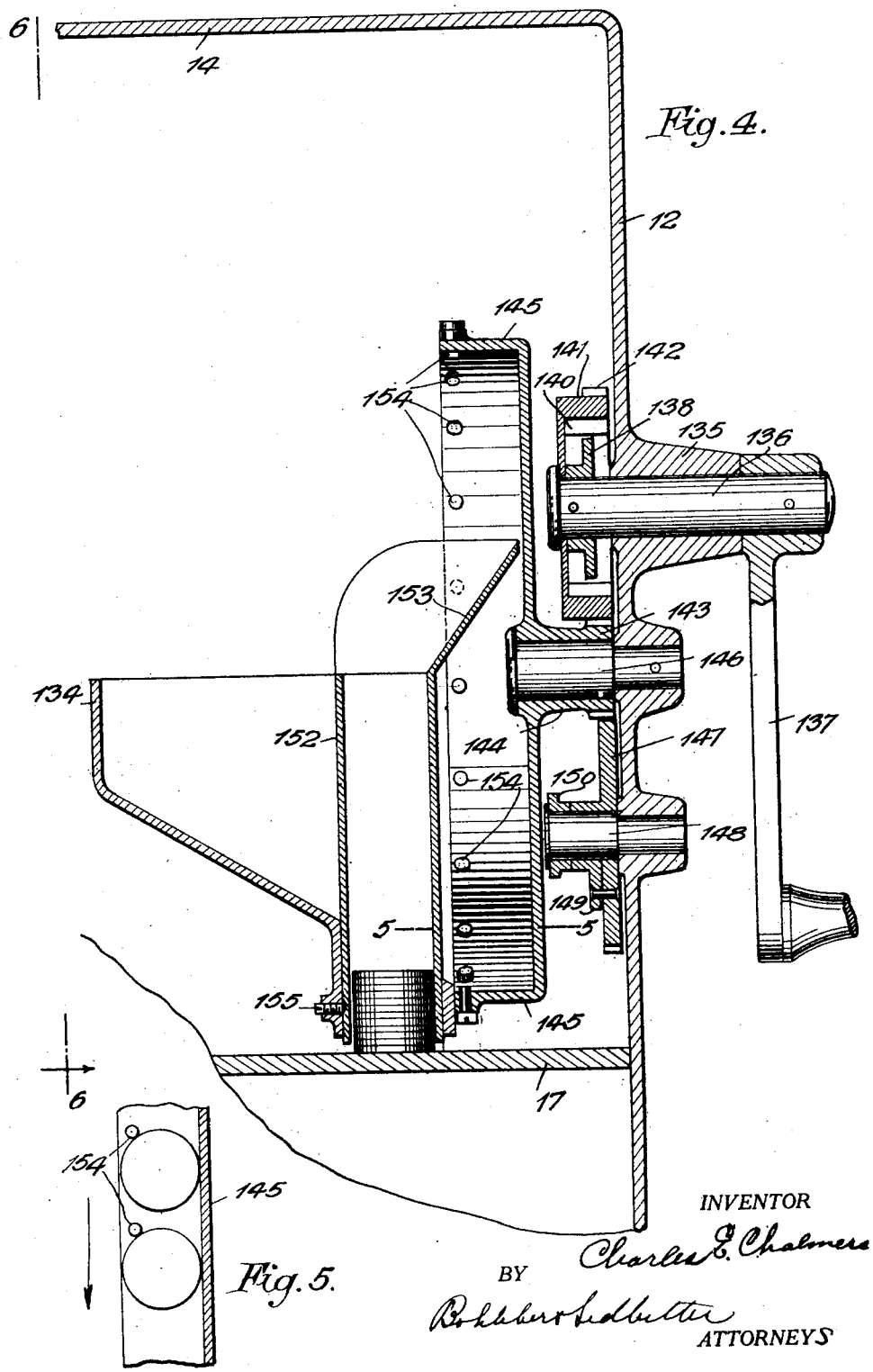

April 21, 1931.    C. E. CHALMERS    1,801,797
CHANGE MAKING MACHINE
Filed March 19, 1924    8 Sheets-Sheet 4

INVENTOR
Charles E. Chalmers
BY
Bohbert Ledbetter
ATTORNEYS

April 21, 1931. C. E. CHALMERS 1,801,797
CHANGE MAKING MACHINE
Filed March 19, 1924 8 Sheets-Sheet 5
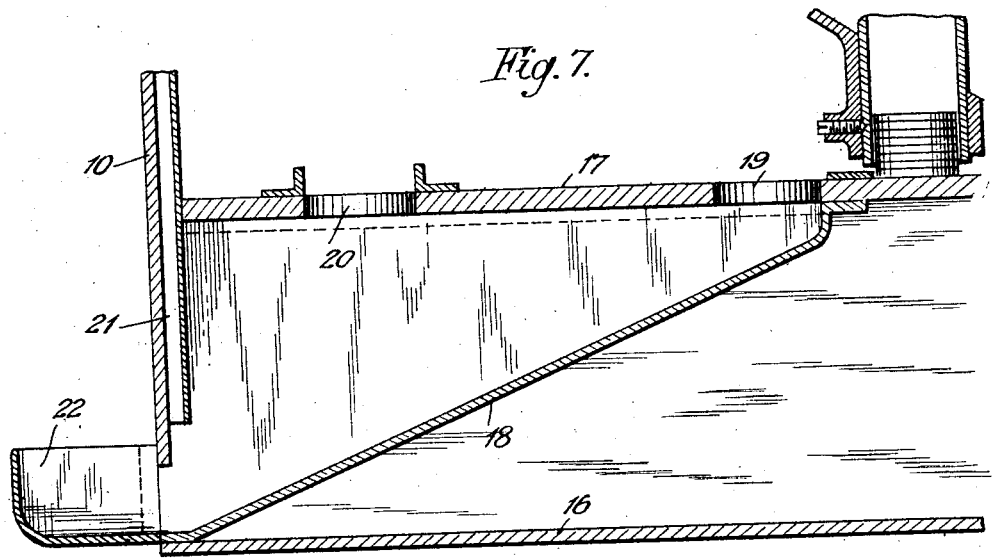
Fig. 7.
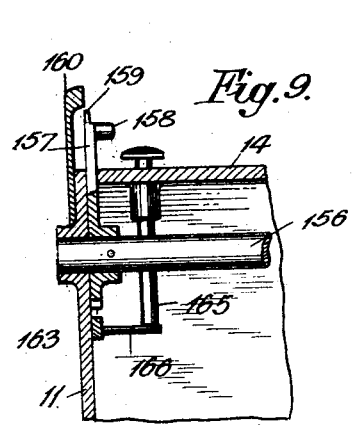
Fig. 9.
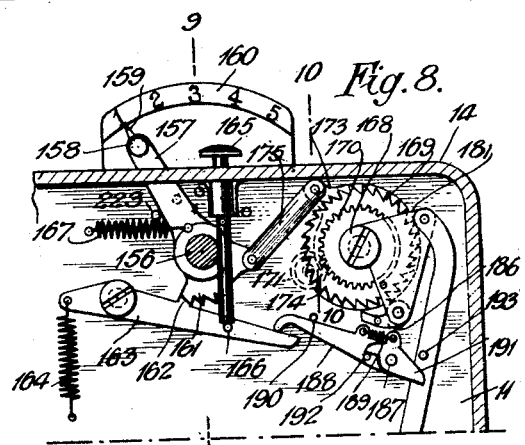
Fig. 8.
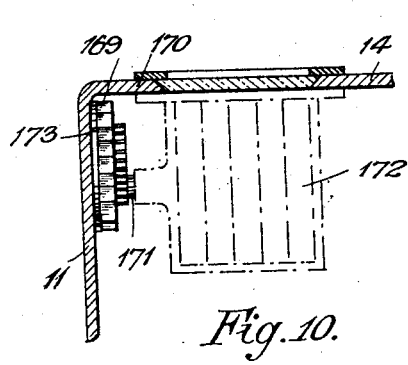
Fig. 10.
INVENTOR
Charles E. Chalmers
BY
Bohleber & Ledbetter
ATTORNEYS
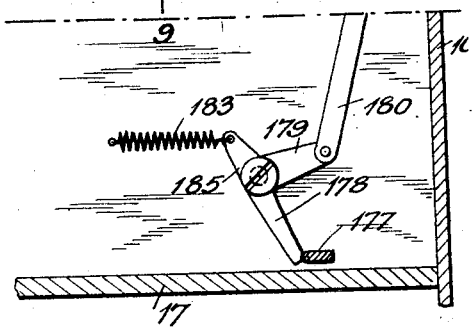

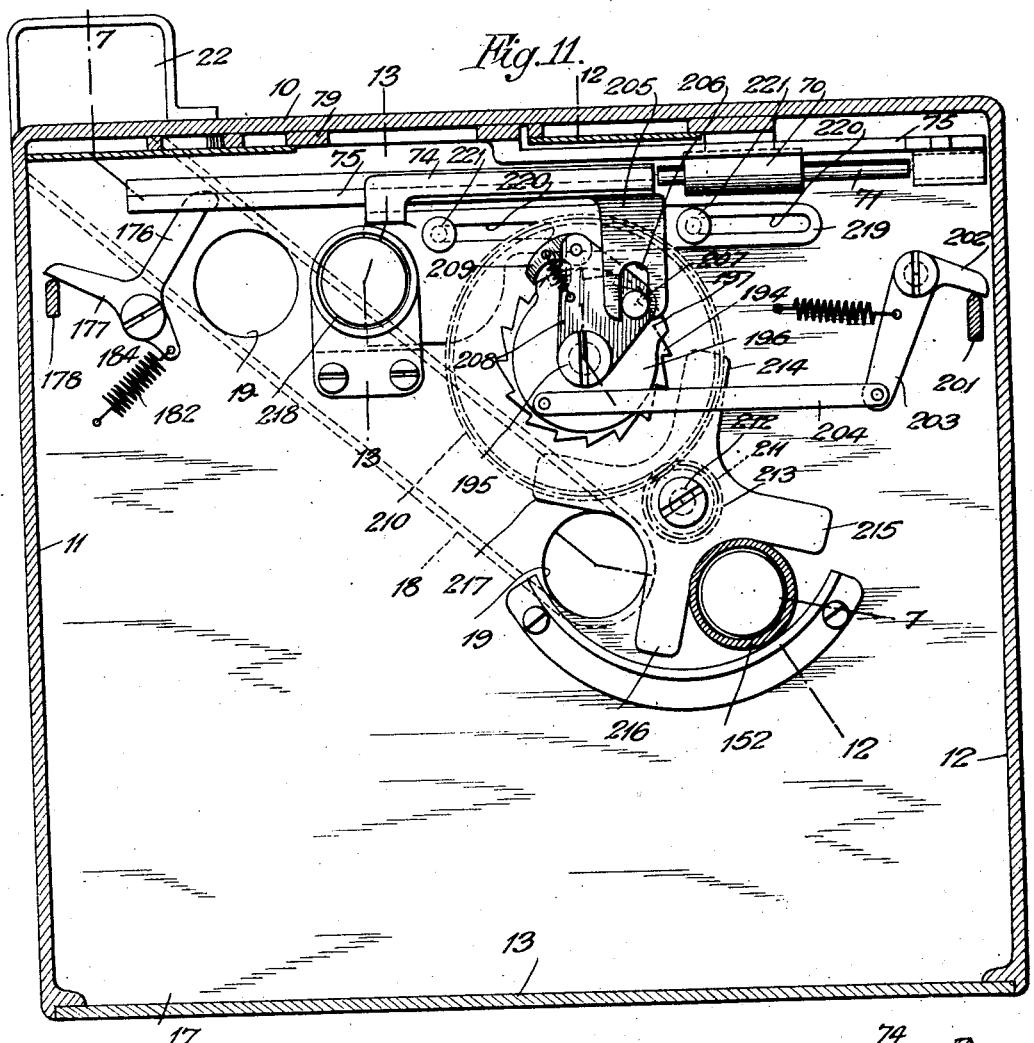

April 21, 1931.　　C. E. CHALMERS　　1,801,797
CHANGE MAKING MACHINE
Filed March 19, 1924　　8 Sheets-Sheet 7
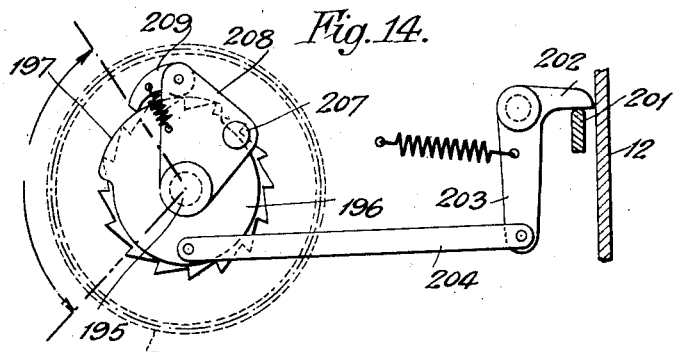
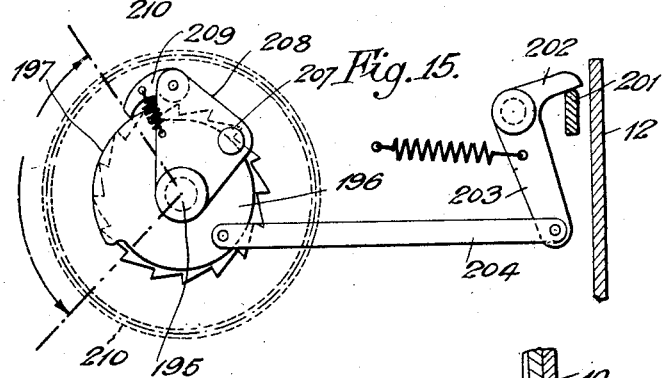
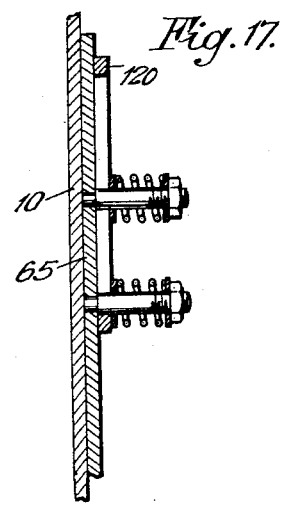
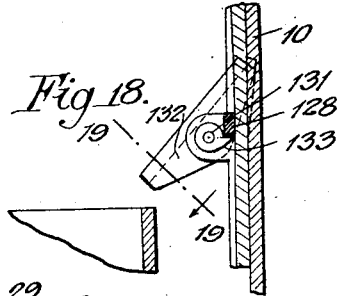
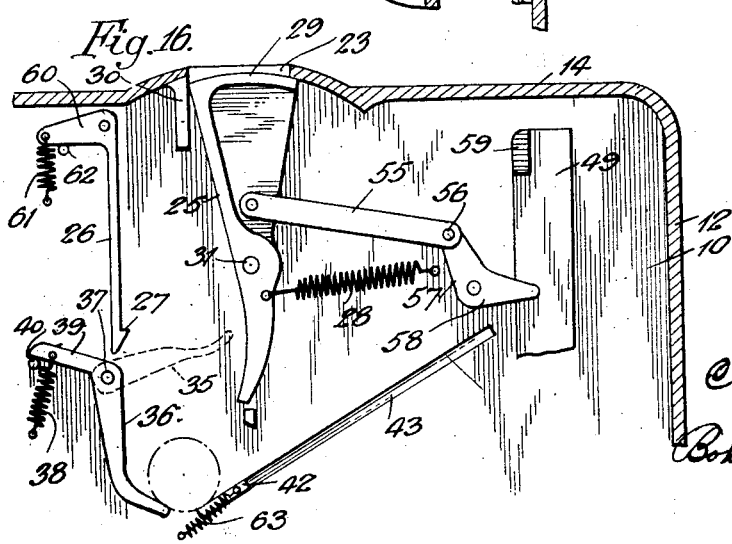
INVENTOR
Charles E. Chalmers
Bohleber & Ledbetter
ATTORNEYS April 21, 1931.  C. E. CHALMERS  1,801,797
CHANGE MAKING MACHINE
Filed March 19, 1924  8 Sheets-Sheet 8

INVENTOR
Charles E. Chalmers
BY
Robert Ledbetter
ATTORNEYS

Patented Apr. 21, 1931

1,801,797

UNITED STATES PATENT OFFICE

CHARLES E. CHALMERS, OF NEW YORK, N. Y.

CHANGE-MAKING MACHINE

Application filed March 19, 1924. Serial No. 700,213.

This invention relates to multiple fare collecting and change making machines and while the embodiment herein illustrated is described as being utilized primarily for collecting fares on motive vehicles, it is to be understood that the invention is not limited to such use, as it will be readily manifest from the following description and the accompanying drawings that it has numerous other kindred uses and applications, and that it is capable of being used solely as a machine for making change.

The invention has to do with a simple and improved machine of the above character which is not only capable of receiving the exact fare, but which will return the necessary change whenever a passenger drops a coin therein of a denomination or value higher than the price of such fare, and for the purposes of elucidating the principles of my invention, the preferred embodiment illustrated and described is designed upon a five cent fare basis; consequently the change returned, if any, is either five cents or a multiple thereof.

One of the more important features of the present invention is the provision of improved mechanism for receiving one or a multiple of fares from a coin deposited in the machine, in combination with improved mechanism employed in connection therewith for registering on a single counter the exact number of fares taken from said coin, or, more broadly stated, for registering the net amount of cash received in or collected by the machine.

It is important in a machine of this character to provide mechanism which will enable the collection of a plurality of fares from coins of higher denomination which have been deposited. The specific embodiment of my invention herein illustrated and described is provided with such mechanism and the same is so constructed and arranged that it will collect one, two, three, four or five fares from a quarter or a half dollar, and after electing and selectively controlling the number of fares to be collected, the same will not be registered on the machine after the deposit of the coin until the operating handle has been actuated. This prevents tampering by unauthorized persons. Where a ten cent piece has been deposited, it will register one or two fares, but if only one fare is collected from the coin, the proper amount of change will be returned. It will, of course, be understood that when the exact fare is deposited (in this case a five cent piece) no change will be returned, and incidentally no change mechanism will be actuated, but that the receipt of the same will be properly registered. The machine is equipped with improved manually operated means, preferably on the top thereof, for controlling or determining the number of fares to be collected from any particular coin of a higher denomination than that of the exact fare charged.

In the preferred embodiment of my invention illustrated and described herein, the coins utilized for making change comprises preferably only five and twenty-five cent pieces, as that reduces very materially the bulk of the machine as compared with a machine embodying the same principles, and which utilizes only one coin or a different group of coins for making change. On the other hand, this enables the mechanism to be reduced to a much simpler form, as compared with a machine embodying the same principles and which is equipped to return more than the stated number of change coins. However, it will be readily apparent that the invention is not limited in this respect to the specific form hereinafter described and illustrated in the accompanying drawings, nor is it to be understood that the invention is to be limited to a form of machine capable of receiving only a five cent fare. In short, the principles are the same irrespective of the number of coins utilized for making change, and irrespective of the fare charged.

In a machine which utilizes only the five and twenty-five cent pieces in making change, I have found it to be inconvenient to carry in the change box the necessary supply of five cent pieces to make change particularly over long routes or where the traffic is heavy. Accordingly I have devised means automatically actuated from the operating crank to utilize for change making purposes all, if necessary, of the five cent pieces deposited by the passengers in payment of their fares. The improvements in this regard are considered as among the more important features of my invention.

One of the serious objections heretofore of all coin operated machines, is the fraudulent use made of the same by the deposit therein of slugs and spurious coins. This objection is entirely overcome in this machine for the reason that any slug or spurious coin dropped into the coin chute may be readily returned or rejected by the operator without interfering in the least with the receiving of the genuine coins deposited. In keeping with the foregoing mechanism is provided under the control of the operator for directing the coins in said chute at will either into a passageway leading the same to an operative position in the machine, or into a passageway to enable the return of the coin deposited. And in case the coins are returned I have provided means for making a register thereof, and another important feature of my invention resides in the simple mechanism which I have devised for effecting the return of spurious coins in combination with the registering mechanism associated therewith.

The actuation of the change return mechanism is accomplished through the intermediary of the coins after the same have been properly located in operative position in the machine. Remembering that the coins are arrested in the chute for inspection, and that means must be provided for thereafter directing said coins into proper position for controlling the change return mechanism through the intermediary of the same, it will be understood that some positive means must be employed to enable a sufficient lapse of time after the release of the coins from their arrested position to enable the same to travel to operative position before the change return mechanism is actuated. In the present embodiment of my invention this is accomplished by the sequence of operations of the various parts in performing their respective functions. The mechanism for accomplishing this result is an important feature of my invention.

Another of the more important features of this invention is the incorporation in a machine of this type of simple mechanism for taking care of all of the features above related, and in the ability of the machine to be readily applied to collecting machines of general application and use. Furthermore, I have illustrated and described herein a very simple expedient which enables the invention to be employed at will either as a fare collecting machine or simply as a change making machine.

Further objects, features and advantages of construction and mode of operation will more fully appear from the detailed description below taken in connection with the accompanying drawings in which, Fig. 1 is an inside elevation of the front of the box taken substantially on the line 1—1 of Fig. 6.

Fig. 4 is a vertical section taken substantially on the line 4—4 of Fig. 6.

Fig. 5 is a horizontal section taken on the line 5—5 of Fig. 4.

Fig. 7 is a vertical section taken substantially on the line 7—7 of Fig. 11, showing the change receptacle for nickles, the coin chute for the return of change and the discharge of five and twenty-five cent pieces from the storage receptacles into the coin chute. The coin receptacle for the return of change is also illustrated in this view.

Fig. 8 illustrates the mechanism for controlling the number of coins to be returned, if any, for any particular coin deposited in the coin chute by the passenger.

Fig. 9 is a vertical section taken on the line 9—9 of Fig. 8.

Fig. 10 is a vertical section taken substantially on the line 10—10 of Fig. 8.

Fig. 11 is a horizontal section of the entire box taken substantially on the line 11—11 of Fig. 6.

Fig. 12 is a vertical section taken on the line 12—12 of Fig. 11.

Fig. 13 is a vertical section taken substantially on the line 13—13 of Fig. 11.

Figs. 14 and 15 illustrate two different positions of the turnstile shield for controlling the angular distance through which the turnstile is rotated to determine the number of five cent pieces to be returned to the passenger.

Fig. 16 illustrates the mechanism in a closed position for preventing the admission of coins after one coin has been deposited in the coin chute.

Fig. 17 illustrates a detail of the gauge.

Fig. 18 illustrates the operative position of the mechanism for the discharge of the five cent pieces into the hopper of the machine.

Fig. 19 is a section taken on the line 19—19 of Fig. 18.

Figure 20:
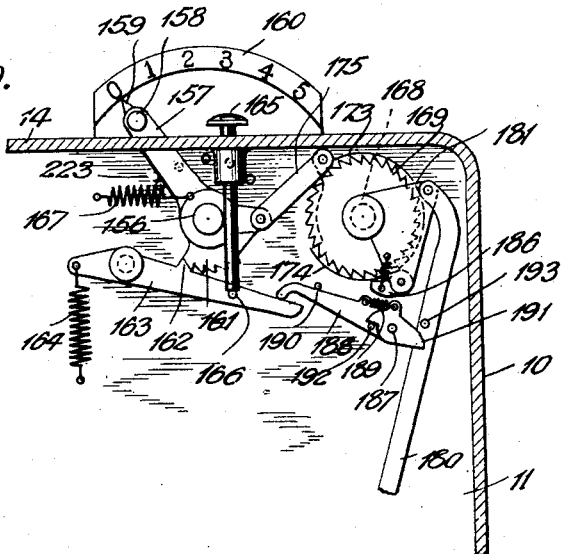
Figs. 20 and 21 illustrate a modified form of the invention.
Figure 21:
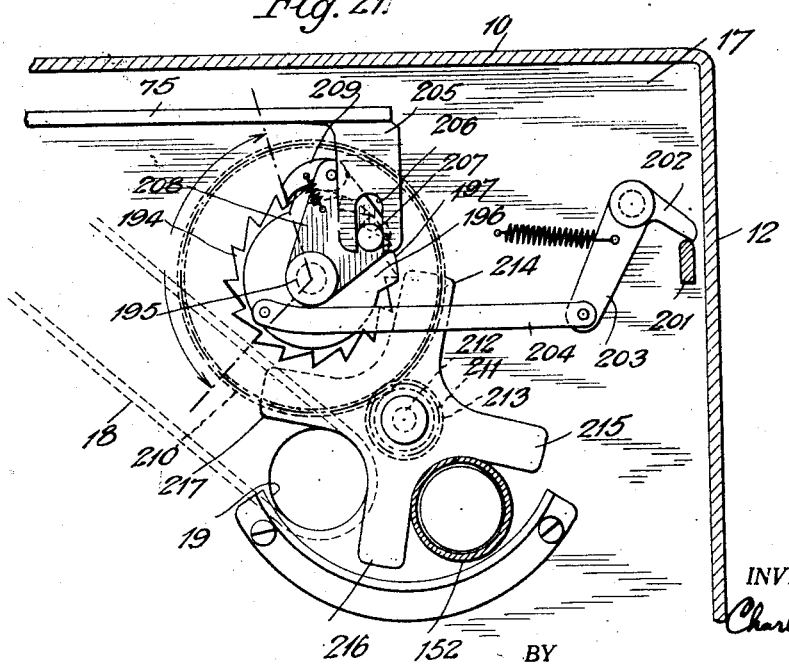

In Figures 1 to 19 inclusive I have illustrated in sufficient detail the necessary mechanism for enabling any one skilled in this art to build a machine for the specific purpose of collecting fares, charges, etc. In Figures 20 and 21 I have illustrated how the same machine may be employed for the sole purpose of making change. The construction illustrated in Figures 1 to 19 inclusive will be first described.

The description will be more readily followed if it is borne in mind some of the more important features of construction and operation of the machine as a whole. The invention, among other things, comprises (1) means for enabling the coins to be examined; (2) mechanism to enable spurious coins or slugs to be rejected; (3) mechanism for enabling the admission of the coins into operative position in the machine; (4) mechanism controlled by the diameter of the coin deposited for determining the amount of change to be returned irrespective of the denomination of the coin; (5) setting mechanism for collecting a predetermined number of fares irrespective of the size of the coin deposited; (6) a single counter common to the different denominations of coins deposited for registering the number of fares collected; (7) change ejector mechanism common to the coins of different denominations; and (8) mechanism utilized by coins deposited for change making. And it may be stated at this point that after the deposit of a genuine coin it is only necessary to actuate the operating crank 137 to return the appropriate change, except where a plurality of fares are to be collected from a particular coin in which case the arm 157 is also adjusted along the sector 160. The arm 157, however, is returned to its normal position, indicated in Fig. 8, after each crank operation.

Referring to the drawings in detail the reference numeral 10 designates the front portion, 11 and 12 the side portions, 13 the rear portion and 14 the top portion of a suitable casing or housing in which the mechanism is enclosed. Access may be had to the interior of this casing in any desired way, but in the embodiment illustrated I prefer for that purpose that the rear portion 13 be removably connected to the side portions 11 and 12, and to that end it is removably held in fixed position to the side portions by means of suitable locking mechanism illustrated at 15. See Fig. 6. The housing is provided with a bottom 16 (see Fig. 7) and adjacent to but above the same is a horizontal platform or partition 17 extending entirely across the casing and serves to support certain parts of the mechanism. Between the bottom 16 and the platform 17 is located an inclined coin chute 18 (see Fig. 7). The five cent change pieces discharged through the opening 19, the twenty-five cent change pieces discharged through the opening 20, and the rejected slugs from the passageway 21 fall into this chute. The various coins and change falling on to the inclined chute 18 slide down the same by gravity into a receptacle 22, which is accessible to the passenger being located, as it is, exterior to the housing.

Figure 1:
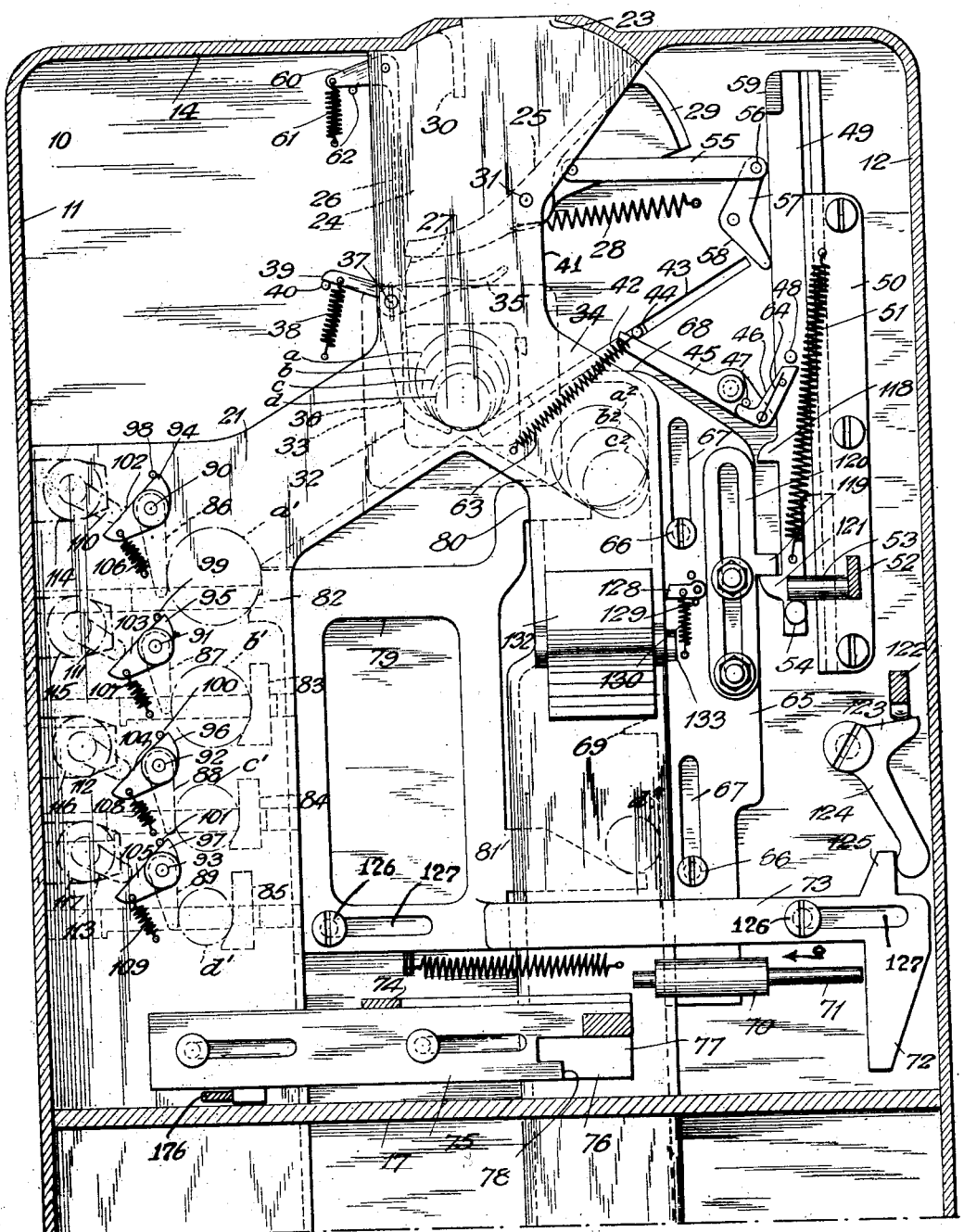
Figure 2:
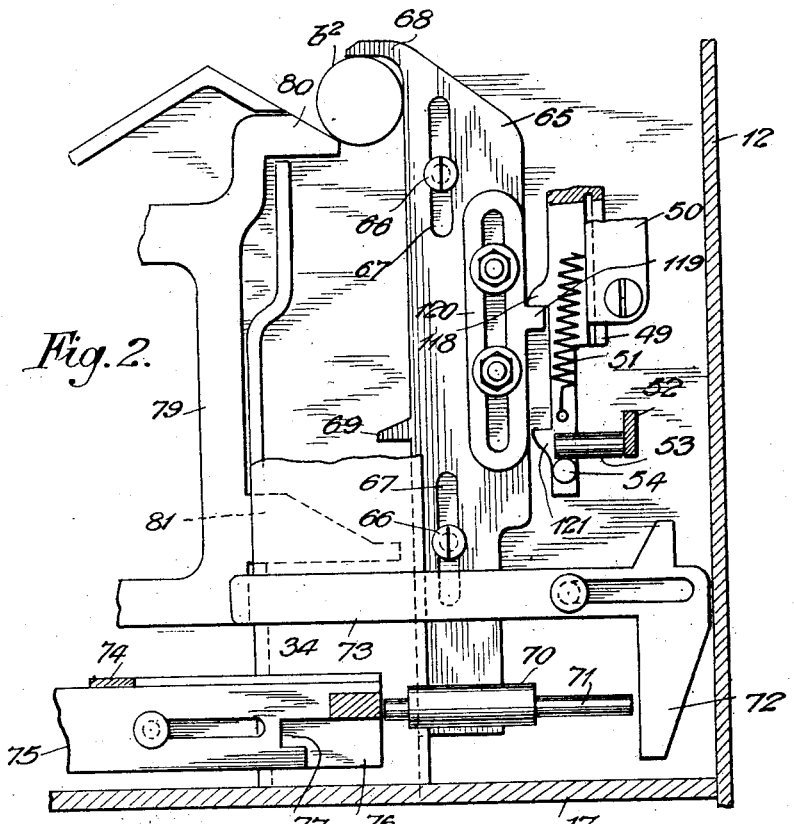
Figs. 2 and 3 illustrate different relative positions of certain mechanism illustrated in Fig. 1.
Figure 3:
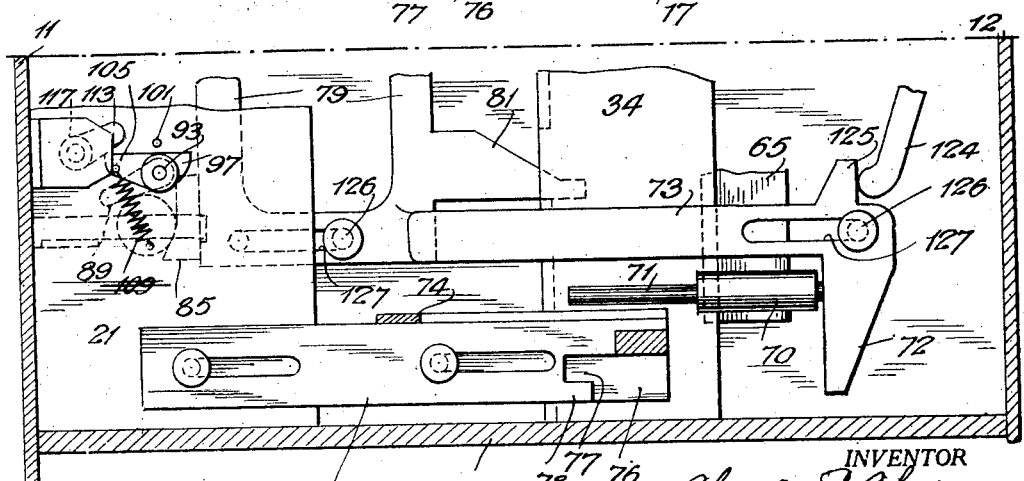

Referring now more particularly to Figs. 1, 2 and 3, a coin of any denomination, deposited by the passenger into the slot 23, falls into a chute 24, strikes the upper inclined surface of the gate member 25, and rolls down said surface until it impinges against a lever 26 which is provided with a shoulder 27 upon which normally rests one end of said gate member 25. The engagement of the coin deposited into the chute 24 with the spring pressed lever 26, due to the momentum of said coin, moves said lever 26 to the left thereby releasing the gate member 25 after which the latter automatically assumes the position illustrated in Fig. 16. The gate member remains in this position until it is restored to normal position by the subsequent operation of the machine, as will presently be described. This movement of the member 25 is effected by means of a suitable spring 28, one end of which is attached to the lower end of the member 25 and the other end of which is suitably secured to the front wall of the casing of the machine. The movement of the member 25 from the position illustrated in Fig. 1 to the position illustrated in Fig. 16 enables the coin deposited to assume one of the four positions $a, b, c, d$ depending upon whether or not it is a fifty, twenty-five, five or ten cent piece respectively. At the same time the end 29 of the lever 25 temporarily closes the opening or slot 23 against the deposit of any more coins. Adjacent the coin slot 23 is an abutment 30 which serves to limit the movement of the member 25 about its pivotal point 31 as a center. See Fig. 16. Opposite the coin positions $a, b, c$ and $d$ the front wall 10 is provided with a transparent member 32 to enable the operator to ascertain whether or not the coins deposited are spurious or genuine. It is beveled to fit a correspondingly shaped beveled opening in the wall 10 and is held in position by means of a plate 33 (see Fig. 6). The coin chute 24 diverges into a passageway 21 through which the spurious coins or slugs are adapted to be ejected from the machine and also into a chute 34 through which the genuine coins deposited may be received into operative position in the machine. If the coin deposited is a spurious one, that is a slug, the manually actuated lever 35 is pressed downwardly which moves the arm 36 in a clockwise direction thus enabling the slug deposited to be admitted to the chute 21 and also enabling the particular slug to assume one of the four positions $a', b', c', d'$ depending upon whether it is of the size of a fifty, twenty-five, five or a ten cent piece respectively. From any one of these positions the slug is ejected from the machine by mechanism which will be described in further detail later on. The lever 35 and arm 36 are constructed to operate in unison about the common pivot 37 as a center and are automatically returned to normal position after the release of the lever 35 by means of a spring 38.

Also operating in unison with the lever 35 and the arm 36 is a second arm 39 normally resting against the stud 40 to limit the return movement of the parts 35 and 36 under the action of the spring 38 as will be clearly evident from Fig. 1. The chutes 24 and 34 are preferably formed by means of a stamped member 41 provided with flanges on its edges which rest upon the interior front wall of the machine. Obviously the stamped member may be made in one or a plurality of sections.

If the coin deposited into the chute 24 proves upon examination to be genuine it is then caused to move to the positions $a^2$, $b^2$, $c^2$ and $d^2$ depending upon whether or not it is a fifty, twenty-five, five or a ten cent piece respectively. It will be seen from Fig. 1 that in the positions $a$, $b$, $c$ and $d$ the coin rests not only upon the arm 36 previously described but upon a second gate member 42 sliding in a groove 43 in the front wall of the machine. When the gate member 42 is moved to the right, viewed from Fig. 1, the coin deposited is free to move from one of the four positions $a$, $b$, $c$, $d$ to one of the four positions $a^2$, $b^2$, $c^2$, $d^2$ respectively. From the foregoing it will be clearly apparent that upon the movement of the arm 36 as previously described the gate member 42 serves to deflect the coin from the chute 24 into the chute 21, and that upon the movement of the gate member 42 the arm 36 serves to deflect the coin from the chute 24 into the chute 34. The mechanism for moving the gate member 42 to enable the discharge of the coins from the chute 24 down the chute 34 to the positions $a^2$, $b^2$, $c^2$ and $d^2$ will now be described.

The slide member 42 is equipped with a laterally projecting stud 44 and pivotally mounted to the interior front wall of the machine is a lever 45 one end of which is adapted to engage the stud 44 and upon the opposite end of which is pivotally mounted a pawl member 46, the lower end of which pawl member normally rests against a stud 47 on the lever 45 and the other end of which, in normal position, is in the path of a stud 48 mounted upon the vertically reciprocating slide 49 which is guided in its upward and downward movement by means of a guide 50 rigidly secured to the interior of the front wall of the casing. When the reciprocating member 49 is moved downward by mechanism which will be presently described the stud 48 engages the outer end of the pawl 46 with a result that a clockwise movement is imparted to the lever 45 around its pivotal point as a center, and thus by contact of the said lever with the stud 44 on the slide member 42, the latter will be moved within the groove 43 and withdraw from the coinway 34 to enable the coin deposited to pass from the chute 24 to the said chute 34. The slide 49 is held in its uppermost or normal position by means of the spring 51 as clearly illustrated in Fig. 1.

It is moved downwardly, however, by means of a lever 52, whose actuation will be described in detail below, and upon which is mounted a laterally projecting stud 53 normally engaging with a rearwardly projecting stud 54 located upon the said slide 49. The downward movement of the lever 52 will impart a downward movement to the slide member 49 to actuate the gate member 42 as previously described. This slide member 49, however, has other duties to perform and these will now be described in detail.

To the upper portion of the gate member 25 is pivoted one end of a link 55, the other end of which is pivotally connected at 56 to one arm 57 of a bell crank lever, the other arm 58 of which, while the gate member 25 is closed, is in the path of a lug 59 projecting rearwardly from the slide member 49. When the gate member 25 is closed it will be seen from Fig. 16 that upon the downward movement of the slide member 49, the arm 58 of the bell crank lever 57—58 will be engaged by the projection 59 and restore the gate member 25 to the normal position illustrated in Fig. 1, that is to say, to the position where the lower end of the gate member 25 engages the shoulder 27 of the spring pressed member 26. However, it will be understood from the construction illustrated that the restoration of the gate member 25 to the normal position illustrated in Fig. 1 must not be effected until after the coin is discharged from one of the positions $a$, $b$, $c$, $d$ to one of the positions $a^2$, $b^2$, $c^2$, $d^2$. It may be stated at this point that the lever 26 is equipped with an arm 60 normally held in contact by a spring 61 with a stud 62. The momentum of the coin in sufficient to overcome the tension of the spring 61 and thus release the gate member 25. The gate member 42 is restored to its normal position illustrated in Fig. 1 in the following manner. Upon the downward movement of the slide 49 the stud 48 thereon, as above stated, engages with the outer end of the pawl 46 causing said outer end to describe an arc of a circle the center of which is the pivotal axis of the lever 45, thus enabling the pawl to be withdrawn from operative engagement with the stud 48 and also enabling the spring 63 to restore said gate member 42 as well as the lever 45 to normal position. It may be stated at this point that upon the return movement of the slide member 49 to normal position the stud 48 will cam the pawl 46 in a counter-clockwise direction about its pivotal point as a center and out of its path. A suitable spring 64 is employed to maintain the lower end of the pawl 46 normally in contact with the stud 47 of the lever 45 and therefore the outer end normally in the locus of the stud 48 for reasons which have been described.

As before stated the deposit of the coin into the machine if accepted ultimately assumes one of the four positions $a^2$, $b^2$, $c^2$ and $d^2$ and when in this position the coin controls or determines the amount of change to be returned through mechanism about to be described. It is understood, of course, that if a five cent piece is deposited no change will be returned. One of the more important features of my invention comprises mechanism common to all of the coins and controlled by the latter for determining the amount of change to be returned in accordance with the different diameters of the coins deposited. Located in juxtaposition to the slide 49 is an upwardly and downwardly reciprocating gauge 65 which is controlled in its movement by screws 66 anchored in the front wall 10 and which pass through slots 67 in said gauge. The upper portion of this gauge 65 is provided with a lateral projection 68. The downward movement of the gauge 65 by mechanism which will be described later on, causes the projection 68 thereon to engage the coin located in one of the positions $a^2$, $b^2$ and $c^2$. It will be observed that the position $d^2$ for the ten cent piece deposited is at a point down the chute 34 somewhat beyond the positions $a^2$, $b^2$ and $c^2$. For that reason the gauge 65 is provided with a second projection 69 adapted to engage with and be limited in its downward movement by the ten cent piece when the latter is in its operative position $d^2$. The lower end of the gauge is equipped with a horizontal barrel 70 in which is movably mounted a spring pressed plunger 71. If there is a fifty cent piece deposited in the position $a^2$ this so determines the limit of the downward movement of the gauge 65 that the position of the plunger 71 will be as indicated at $a^3$ in Fig. 12. The normal position, however, of the plunger 71 is clearly indicated in Fig. 1 and at $m$ in Fig. 12. When in the $a^3$ position the movement of the plunger 71 by means of the finger 72 of a horizontally actuated arm 73 will impart a movement to said plunger in the direction of the arrow $o$ which in turn will impart a predetermined movement to the slide member 74, slide member 75 and slide member 76. The slide member 74 as will more fully appear from the detailed description below, effects the discharge of a twenty-five cent piece as a part of change to be returned; the slide 75 operates a turnstile to discharge the requisite number of five cent pieces to be returned as change; and the slide 76 actuates a counter to indicate the number of fares paid. If there happens to be a twenty-five cent piece in the position $b^2$ this will enable a further downward movement of the gauge 65 so that the plunger 71 will assume the position indicated at $b^3$ illustrated in Fig. 12. See also Fig. 2. In this position only the slide members 75 and 76 are actuated for the purposes previously stated. If there is a five cent piece in the position indicated by $c^2$ a still further downward movement of the slide member 65 is permitted, thus enabling the plunger 71 to assume the position of $c^3$ indicated in Fig. 12, in which case only the slide member 76 is actuated to count the fare deposited, no change being returned in this case. If there is a ten cent piece in the machine in the position indicated at $d^2$ then the gauge 65 is enabled to move still further causing the plunger 71 to assume the position indicated at $d^3$ in Fig. 12. When the plunger 71 is in the position indicated at $c^3$, determined by the five cent piece in the position $c^2$, it will be opposite the cavity 77 in the slide 75, the depth of which is at least equal to the full stroke of the plunger 71, in consequence of which, no movement is imparted to the slide 75 with a result that no change is returned. When the plunger is in the position indicated at $d^3$ it will, toward the end of its movement, engage with the projection 78 located upon the slide 75 and effect a partial rotation of the turnstile to return five cents in change. If no coin is deposited in the machine the gauge 65 is permitted to move downwardly still further, causing the plunger 71 to assume the position indicated at $n$ in Fig. 12. When the plunger 71 is in the position indicated at $n$ neither the slide 75 nor 76 is operated and the machine will not register a fare or deliver change. It will, however, be understood that in all of the positions $a^3$, $b^3$, $c^3$ and $d^3$ a full stroke will be imparted to the slide 76 to enable the maximum number of fares collected to be registered. It may be pointed out however, that the amount of change returned, if any, and the fares to be recorded are controlled by a manually actuated setting mechanism. The setting mechanism will be described in detail below.

The horizontally actuated arm 73 is provided with an upstanding member or rather framework 79 movable back and forth therewith. One side of this framework is provided with two projections 80 and 81 both of which enter at different heights into the coin chute 34. The normal position of the framework is indicated in Fig. 1. The projection 80 serves to arrest the movement of the fifty, twenty-five and five cent pieces in the respective positions $a^2$, $b^2$, and $c^2$, whereas the projection 81 serves to arrest the movement of the ten cent pieces at the position $d^2$, it being understood that the projection 80 does not extend sufficiently far into the chute 34 to interfere with the movement of the ten cent piece past said projection to its position $d^2$. It will therefore be apparent that when the slide 73 is moved to the left, as viewed from Fig. 1, a corresponding movement will be imparted to the extensions 80 and 81 with a result that a coin in any one of the positions $a^2$, $b^2$, $c^2$ and $d^2$, according to its diameter, will be freed from its engagement with the extensions 80 and 81, as the case may be, and thereby enabled to continue its downward movement into suitable chambers in the bottom of the machine. The opposite side of the framework 79 preferably enters the passageway 21 for the rejected coins or rather slugs and is equipped with a plurality of arcuate shaped members 82, 83, 84 and 85 which serve in conjunction with the spring-pressed arms 86, 87, 88 and 89 in the passageway 21 to arrest the rejected coins in their respective positions $a'$, $b'$, $c'$, and $d'$. The said arms are rigidly secured to shafts 90, 91, 92 and 93 respectively, suitably journaled in the front wall 10 of the housing and the wall of the passageway 21. Also rigidly mounted upon the shafts just mentioned are arms one of the ends 94, 95, 96 and 97 of which normally engage with studs 98, 99, 100 and 101 and the other ends 102, 103, 104 and 105 of which are connected with springs 106, 107, 108 and 109 for maintaining said arms in normal position, that is in contact with said studs. The ends 102, 103, 104 and 105 serve to actuate the fingers 110, 111, 112 and 113 of the counters 114, 115, 116 and 117 to register the number of coins or rather slugs ejected from the machine. The counter may be supported by any convenient means. I prefer, however, to employ for that purpose suitable brackets projecting from the side wall 11 of the housing, as clearly illustrated in Figs. 1 and 3. Hence it will be seen that when the slide 73 is moved to the left a movement in the same direction will be imparted to the rejected coin with a result that the particular counter is actuated and also with a result that the particular coin is liberated from its position to continue its movement down the passageway 21 into the receptacle 22. See Fig. 7.

The mechanism for imparting a downward movement to the gauge 65 and for restoring it to normal position will now be described. The slide 49 is provided with a laterally projecting lug 118 which engages upon its downward movement with the stud 119 projecting from a member 120 which is supported by and frictionally movable upon the gauge 65. The projection 119 is not only located in the path of the downward movement of the projection 118 but is also in the path of the upward movement of the projection 121 also located upon the slide 49. As before stated the slide 49 is moved downwardly by means of the lever 52, and that it is automatically returned to normal position by means of the spring 51. Upon the downward movement of the slide 49 the projection 118 engages the stud 119 and moves the gauge 65 until the projection 68 thereon contacts with the coin located in one of the three positions $a^2$, $b^2$ or $c^2$ or until the projection 69 engages with the ten cent coin located in position $d^2$. It will be noted that only a slight movement of the gauge 65 is necessitated to cause the projection 68 to engage and be arrested in its movement by a fifty cent piece located in the position $a^2$. The continued downward movement of the slide 49 will thereafter have no other effect than to continue the movement of the frictionally held member 120 independent of the gauge 65. If the twenty-five cent piece is located in the position $b^2$, or if a five cent piece be located in the position $c^2$, or if a ten cent piece is in the position $d^2$, the only difference in operation is that the distance through which the gauge 65 moves is successively greater than what it moves to bring it in contact with the fifty cent piece and that the movement of the member 120 relative to the gauge 65 correspondingly less. The gauge 65 and the frictional member 120 will be returned to their relative normal positions as indicated in Fig. 1, by the engagement of the lug 121 with the stud 119 upon the return of the slide 49 to its normal position. It will therefore be readily apparent that the spring 51 not only serves to maintain the slide 49 but likewise the gauge 65 and the frictional member 120 in their respective normal positions. It will also be apparent from the foregoing that the gauge 65 is only actuated after the slide has travelled a substantial distance downwardly, that is not until the stud 118 engages with the lug 119. The interval of time involved in this part of the travel of the slide is amply sufficient for the operation, by said slide in the manner above described, of the gate member 42, and also amply sufficient prior to the initial movement of the gauge 65 to enable the coin deposited in one of the four positions $a$, $b$, $c$, $d$ for examination to pass into one of the four operative positions $a^2$, $b^2$, $c^2$, $d^2$ after said gate member 42 has been actuated to release said coin.

The horizontally movable arm 73 is actuated by the operating crank preferably including among other things the lever 122 (see Figs. 1 and 6) acting upon one arm 123 of a bell crank lever, the other arm 124 of which engages with an upstanding lug 125 on the said arm 73. The latter is limited in its to and fro movement by means of set screws 126 which pass through the slots 127 in said arm. This mechanism just described is clearly illustrated on Fig. 1. It has heretofore been stated that the five cent pieces deposited by the passenger are utilized for change making. This is an important feature of my invention. To enable this to be done these particular coins must be segregated from the other coins deposited in the machine, and to accomplish this the following mechanism is provided. Pivotally mounted upon the gauge 65 to travel therewith but movable relative thereto is a member 128 held in its normal position against the stud 129 by means of a spring 130, Mounted upon a pintle 131 and adapted to oscillate therewith is a deflector 132 normally in the position indicated in Fig. 6. The pintle 131 is equipped with an arm 133 (see Fig. 18) located in the path of movement of the member 128. If there is a fifty or a twenty-five cent piece in the position $a^2$ or $b^2$ the downward movement of the gauge is not sufficient to bring the member 128 into contact with the arm 133 of the deflector 132. However, if there is deposited a five cent piece in the position $c^2$ the pivoted member 128 will come into contact with the arm 133 and oscillate the deflector to the position illustrated in Fig. 18 across the coin way 34. This causes these particular coins to be deflected from the coin-way 34 into the nickel hopper 134. (See Figs. 4 and 6.) This explains in the embodiment of my invention illustrated and described herein, the necessity of so constructing the parts as will enable the operative position of the ten cent pieces to be located beyond the deflector 132; that is to say if it were located at the points $a^2$, $b^2$ and $c^2$ the ten cent pieces would likewise be discharged by the deflector into the hopper 134. The cooperative relation of the coin-way 34 and deflector 132, as well as their construction, is clearly illustrated in Figs. 1, 6, 18 and 19; hence no further description is thought to be necessary, except to say that the deflector is preferably held in and returned to normal position by gravity.

Figure 6:
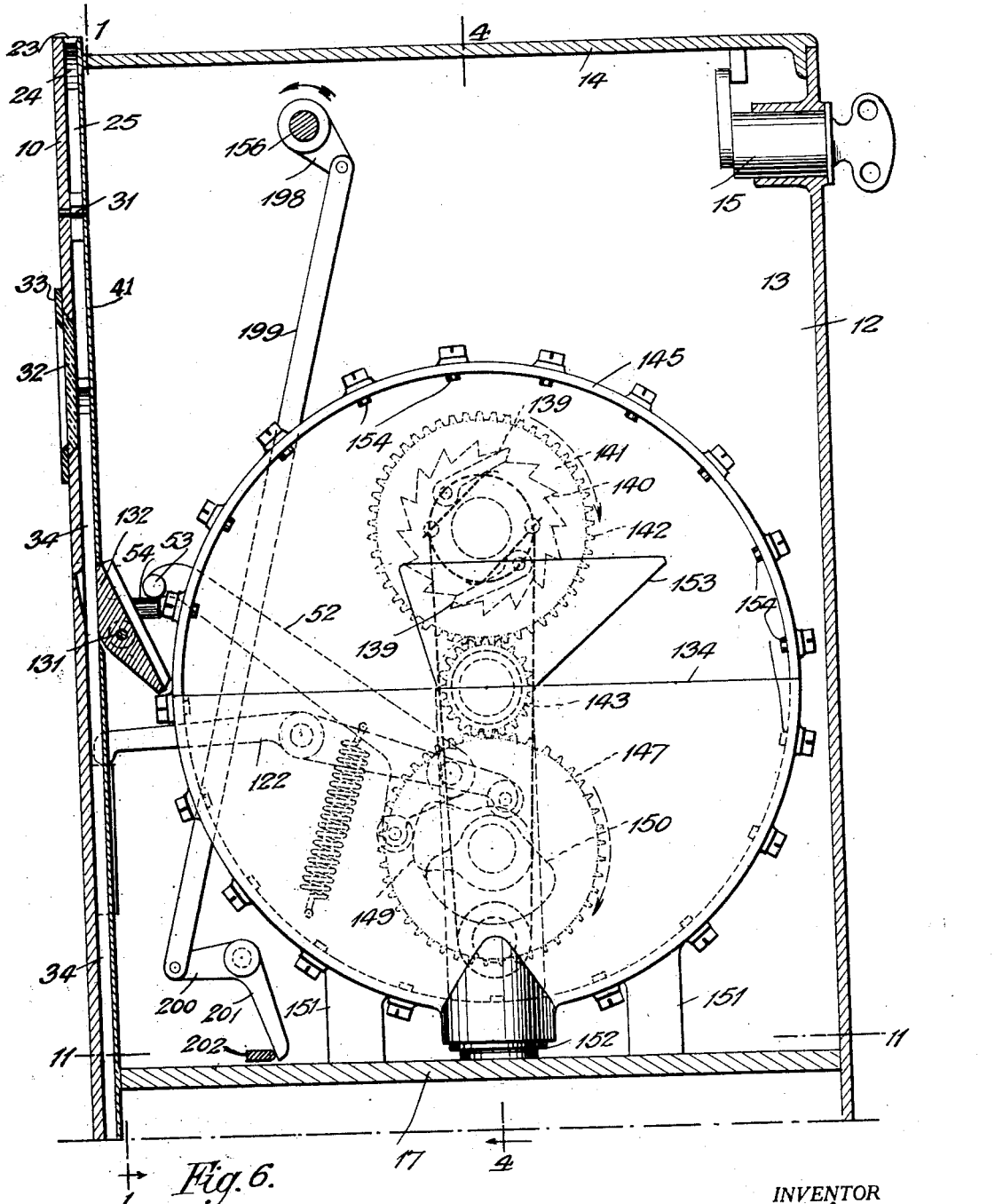
Fig. 6 is a vertical section taken substantially on the line 6—6 of Fig. 4.

The mechanism for actuating levers 52 and 122 will now be described. Referring now to Figs. 4 and 6, it will be noted that the side 12 of the machine is equipped with a boss 135 which constitutes a bearing for the crank shaft 136 upon one end of which is securely mounted an operating crank 137. Upon the opposite end of the crank shaft 136 is fixed a plate 138 which carries two pawls 139 (see Fig. 6) which are adapted to engage the internal teeth 140 of the gear 141 to rotate the latter. The gear 141 is also provided with peripheral or external teeth 142 which engage with a pinion 143 mounted upon the sleeve 144 of the rotating drum 145 which sleeve revolves around the stud shaft 146 as a center. The sleeve pinion 143 in turn meshes with a gear 147 mounted to rotate upon the stub shaft 148. Suitably secured to this gear 147 are two cams 149 and 150. Upon the rotation of the crank 137 the cam 149 actuates the lever 52 to reciprocate the slide 49 as previously described whereas the cam 150 actuates the lever 122 to reciprocate the horizontal slide 73 as described above. The contours of the cams are such that the slide 49 is first moved downwardly to bring the projection 68 of the gauge 65 in contact with the particular coin in one of the three positions $a^2$, $b^2$, $c^2$; or the projection 69 of the gauge 65 in contact with the ten cent piece at position $d^2$, or still further in case no coin has been deposited in the machine, as previously described. After the lever 52 has been moved downwardly sufficiently to impart a complete stroke to the gauge 65 in the manner before stated the lever 122 is then actuated by the cam 150 to impart a movement to the left, as viewed in Fig. 1, of the horizontal slide 73 to perform the operations previously described.

The nickel hopper 134, previously referred to, is suitably supported, as by legs 151, from the platform 17. See Fig. 6. Within this hopper is adjustably mounted a tube 152 provided with a truncated cone 153 which truncated cone projects within the drum 145. Initially the hopper 134, as well as the tube 152 is provided with a supply of five cent pieces. As fast as the five cent pieces are discharged from the lower end of the tube 152 they are replenished by the drum 145 from the hopper 134 in the following manner. Projecting inwardly from the periphery of the drum is a plurality of studs 154 which pick up the nickels in the lower end of the hopper 134 and deposit the same within the truncated cone 153 from which they slide by gravity into the tube 152 where they are automatically stacked. It will be remembered that mechanism is provided in the machine which will direct all five cent pieces deposited by the passengers into the hopper 134. Of course, it will be apparent that when the tube 152 has been filled with coins any additional coins deposited by the drum 145 into the truncated conical portion 153 will merely "overflow" the tube and be discharged again into the hopper 134, in consequence of which it will be noted, as a matter of fact, that except under very abnormal conditions the tube 152 will always be full of nickels. The tube 152 is vertically adjustable by means, for example, of a set screw 155. See Fig. 4.

Mention has been previously made to mechanism for collecting the desired amount of fare from any coin that happens to be deposited into the machine. Of course, if a five cent piece is deposited no change will be returned. The mechanism for controlling the fares collected is illustrated more particularly in Figs. 8, 9 and 11. Upon the shaft 156 is fixed a lever 157 for manually actuating the same. This lever projects through a slot in the top of the casing and is provided with an operating handle 158 and a pointer 159 which moves over a sector 160 having indicia thereon for indicating the number of fares to be collected. The particular machine illustrated and described collects from the coins deposited a maximum of five fares. Consequently, the sector is provided with the numerals 1, 2, 3, 4 and 5 indicating the positions to which the lever 157 should be moved to collect the corresponding number of fares. The end of the lever 157 opposite the end upon which the handle 158 is mounted is provided with a ratchet 161 adapted to engage with a pawl 162 located upon the lever 163. This pawl 162 upon the lever 163 is maintained in contact with the ratchet 161 by means of the spring 164 as clearly illustrated in Fig. 8. From this construction it will be seen that upon moving the lever 157 in a clockwise direction the pawl 162 will engage the successive teeth of the ratchet 161 and maintain the said lever 157 in the position to which it is moved. If, by accident, the lever 157 has been moved too far it can be restored to its initial position by pressing downwardly upon the spring pressed error key 165 in the path of the lower end of which is a pin 166 extending laterally from the lever 163. The downward movement therefore of the plunger 165 will impart a movement to the lever 163 about its pivotal point bringing the pawl 162 out of contact with the teeth on the ratchet 161 after which the lever 157 will automatically restore itself to normal position by means of the spring 167.

Rotatably mounted upon a shaft 168 is a ratchet gear 169 to which is concentrically fixed a gear 170 meshing with a pinion 171 mounted upon a suitable counter 172 (see Fig. 10). Also mounted upon the shaft 168 is a member 173 provided with a shield 174 thereon overlapping a peripheral portion of the ratchet 169. This member 173 is movable to different positions upon the manipulation of the lever 157 to bring the shield 174 into different relative positions about the periphery of the ratchet gear. The member 173 is operatively connected to the lever 157 by means of a link 175. The slide member 75 (see Figs. 1, 8 and 11) engages with one arm 176 of a bell crank lever, the other arm 177 of which engages with the arm 178 of another bell crank lever, the other arm 179 of which is connected by means of a link 180 with the member 181 pivotally connected to the shaft 168 previously described. These parts just described are held in normal position by means of springs 182 and 183 connected to extensions 184 and 185 of the bell crank levers 176—177 and 178—179 respectively. On the member 181 is pivotally mounted a pawl 186 adapted to engage with the teeth of the ratchet gear 169. The pawl 186 is normally held out of contact with the ratchet 169 by means of the shield 174 upon the peripheral surface of which it rides. The construction and relative position of these parts are such that when the lever 157 is in the position shown in Fig. 8 the pawl 186 during the movement of the member 181 by means of the horizontal slide 75 will only engage a tooth of the ratchet 169 upon the last portion of the movement of said horizontal slide 75 so as to indicate on the register 172 the payment of one fare. If the lever 157 be moved to any of the positions 2, 3, 4 and 5 on the sector 160 a corresponding movement of the shield 174 is effected so as to enable an earlier engagement of the pawl 186 with the ratchet 169 and thereby enable the payment of two, three, four or five fares, as the case may be, to be registered by the register 172. Pivoted about the center 187 is an arm 188 normally held by a spring 189 in contact with a stop 190 which arm 188 is normally in contact with the lever 163. Pivoted about the same center 187 is a snap lever 191 one end of which normally rests against the pin 192 projecting laterally from the arm 188. This pawl 191 is normally held against the pin 192 by means of the spring 189. The other end of the snap lever 191 is located in the path of a pin 193 projecting laterally from the link 180. It will therefore be seen that upon the downward movement of the link 180 the pin 193 will cam the lever 191 out of its path and move to the lower side thereof without effecting in any wise the operation of the lever 188. Upon the return movement, however, of the link 180 the pin 193 will engage with the lower side of the snap lever 191 and move the same upwardly and thereby the arm 188 downwardly. The downward movement of the arm 188 imparts a corresponding downward movement to the lever 163 thus releasing the pawl 162 from the ratchet 161 to enable the automatic return of the lever 157 to normal position. It will, of course, be understood that the pawl 186 is spring pressed in order to maintain the same in constant engagement with either the ratchet 169 or the shield 174.

From the foregoing, it will be seen that mechanism is provided for registering the fares collected by the machine, the same being controlled by the lever 157.

Upon reflection, it will be readily apparent that the amount of change to be returned must be controlled in strict accordance with the fares collected. It will be remembered that the horizontal slide 75 is for the purpose of actuating mechanism to discharge the change coins. This mechanism includes a ratchet wheel 194 (see Fig. 11) rotatably mounted upon a stub shaft 195. Upon this shaft is also rotatably mounted a member 196 provided with a shield 197 which overlaps a portion of the peripheral portion of the ratchet 194 and which is similar to the shield 173 illustrated in Fig. 8. Like the shield 173 this shield 197 prevents the ratchet 194 from being actuated through pawl mechanism (to be described later) except at predetermined intervals. The mechanism for adjusting the member 196 in proper position to control the amount of change to be returned comprises an arm 198 (see Fig. 6) fixed to the shaft 156. Pivotally connected to the arm 198 is one end of a link 199 the other end of this link being pivotally connected to the arm 200 of a bell crank lever, the other arm 201 of which engages with the arm 202 (see Figs. 6 and 11) of a second bell crank lever, the other arm 203 of which is connected to the member 196 upon which the shield 197 is mounted by means of a link 204. From what has been just stated, it will be clearly apparent that a movement of the lever 157 to properly position the shield 173 simultaneously and correspondingly positions the shield 197. The net result of this is that each time the shield 173 is positioned to control the movement of the fare register, the shield 197 will be properly positioned to simultaneously control the amount of change to be returned to the passenger.

The mechanism for returning change will now be described. The slide member 75 (see for example Fig. 11) is provided with a laterally projecting member 205 provided with an open slot 206 in the end thereof. This slotted or forked member is in permanent engagement with the stud 207 projecting upwardly from the carrier 208. The reciprocating movement of the member 75, and therefore of the member 205 determines the throw of the carrier 208 around the shaft 195 as an axis of oscillation. Upon the extremity of the carrier 208 is mounted a spring pressed pawl 209 adapted to engage with the teeth of the ratchet 194 previously described. Its engagement with the ratchet, as previously stated, is determined by the position of the shield 197 upon the member 196. Fixed to rotate with the ratchet gear 194 (see Figs. 11 and 12), upon the actuation of the slide 75 is a gear wheel 210 which meshes with a pinion 211 on the shaft 212. Fixed to the pinion is a star wheel 213 provided with prongs 214, 215, 216 and 217. The five cent coin receptacle 152 (see Figs. 4 and 12) is spaced from the platform 17 a sufficient distance to enable the arms of the star wheel to pass between said tube and the platform. The coin tube 152 is spaced sufficiently from the platform 17 to enable the lowermost coin therein to be ejected therefrom into the chute 18 but is close enough to prevent the succeeding coin from being ejected. However, the succeeding coin will drop on the platform 17 as soon as the particular arm of the star wheel passes from under said tube. This construction and relative arrangement of the parts is clearly illustrated in Fig. 12. The size of the gear 210 with respect to the pinion 211 is such that the movement of the ratchet 194 for an angular distance of one tooth thereon will impart a one quarter revoluton to the pinion 211 from which it will be readily apparent that only one coin will be ejected from the tube 152. It will also be understood that if the controlling mechanism is so positioned that the pawl 209 will move the ratchet gear 194 through an angular distance of two teeth thereon two coins will be ejected, and so on. A casual study of the mechanism will clearly reveal that the maximum throw of the carrier 208 will through the pawl 209 move the ratchet 194 through an angular distance of four teeth with a result that four coins will be ejected by the star wheel 213 from the lower end of the tube 152.

As previously stated the operation of the slide member 74 (see Fig. 11) is for the purpose of ejecting a twenty-five cent piece from the lower end of the coin tube 218. To that end there is attached to the slide 74 a member 219 provided with two guide slots 220 therein through which the guide pins 221 project. These pins 221 serve to guide the forward movement of the member 219 upon the forward movement of the slide 74 effected by the plunger 71 as previously described and to guide said member 219 on its return movement which is effected by means of the spring 182. The member 219 is provided with a laterally projecting arm or yoke 222 which passes under the twenty-five cent coin tube 218, so that when the member 219 is moved forwardly for a predetermined distance a coin will be ejected from the tube 218 into the coin chute 18 whence it will pass to the receptacle 22. The spring 182, as before stated, is employed to return the slide 74 back to normal position and this, of course, restores the fork 205 and therefore the carrier member 208 and pawl 209 also to their normal positions ready for the next operation of the machine.

In Figs. 20 and 21, I have illustrated the necessary changes to be made that the machine may be employed only for the purpose of making change. To this end the lever 157 is provided with an additional ratchet tooth on the ratchet 161 whereby the normal position of the lever 157 will be such as to preclude the operation of the counter 172 and also move the member 196 to return an additional five cent piece. And it will be readily apparent that the normal position of the arm 157 may be made at any point along the sector, as by means of a removable stop 223, in which event any fixed number of fares may be collected by a mere actuation of the operating handle 137.

In other words the movable stop 223 shown in Figures 20 and 21 provides means for setting the machine to normally return the exact change for a deposited coin or, as shown in Fig. 8, for normally collecting any predetermined number of fares from said coin by a mere actuation of the operating handle 137. It will also be readily apparent, irrespective of the hole in which the removable stop 223 is located, that the arm 157 in effect is set by said stop to what I shall call, for the want of a better name, a normal fixed position and is adapted to be variously positioned in advance of said stop to another or adjusted fixed position whereby to collect a predetermined number of fares in excess of that which the machine is set by means of the stop 223, to normally collect.

From the foregoing it will be seen that in the improved machine the coins in the chute are fed successively into operative position in the machine; that the mechanism for controlling the amount of change to be returned serves also to control the register for counting the exact number of fares collected on a single counter; that the machine is capable of receiving and registering the exact fare; that from the coins of higher denominations deposited one or a multiple of fares may be collected therefrom; that the location of the coins in operative position and the actuation of the change making mechanism is all effected by the actuation of the main operating crank of the machine; that coins deposited may in turn be employed for change making; that the device as a whole is of very compact form; that the construction is simple, cheap to manufacture, and not liable to get out of order; that all possible danger of the machine being prematurely operated is avoided; and that the invention is adapted to be employed generally with change-making machines. It will therefore be seen that the device is particularly desirable and advantageous in the expeditious handling of a large number of passengers, thus avoiding congestion about the machine and the inevitable delay incident thereto.

I have illustrated and described what I now consider the preferred form of my invention. A number of the parts have been illustrated more or less diagrammatically and the size, proportion and construction of the various elements shown in the present embodiment are intended to serve for illustration purposes only. To avoid prolixity of description duplicate parts have been omitted. It is therefore to be expressly understood that I do not limit myself to the exact construction herein illustrated and described as many changes may be made in points of detail and various other embodiments resorted to without necessarily deviating from the true spirit and scope of my invention.

In this connection reference is hereby made to my copending application, Serial No. 354,491, filed April 12, 1929, wherein I have claimed certain features of my invention shown and described herein; in other words, the patentable subject matter common to this application and my said copending application is claimed in the latter.

By the term operation of the machine, used in some of the claims, I mean that movement of the parts of the machine which results in the collection of one or more fares from a deposited coin.

What I claim is:

1. A change making machine comprising a single chute for receiving the deposited coins for examination, a passageway common to all of the coins leading from said chute to enable a coin to be directed from said chute into operative position in the machine, manually actuated coin controlled means having a single coin controlled element for collecting a predetermined number of fares from any particular coin deposited, and a manually actuated setting mechanism having a single actuating means for varying the number of fares to be collected.

2. A change making machine comprising a single chute for receiving the deposited coins for examination, a passageway common to all of the coins leading from said chute to enable a coin to be received in operative position in said passageway, a single manually actuated means for all the coins deposited controlled by the diameter of said coins for collecting a fare from any particular coin deposited, and a manually actuated setting mechanism having a single actuating means for varying the number of fares to be collected from any coin.

3. A change making machine comprising a single chute for receiving the deposited coins for examination, a passageway leading from said chute and in which the coin is received in operative position therein, manually actuated coin controlled means having a single coin controlled element for collecting a fare from any particular coin deposited, and a single element manually actuated setting mechanism for varying the number of fares to be collected.

4. A change making machine comprising a single chute for receiving a deposited coin in position for examination, means controlled by the deposit of said coin to prevent the deposit of a second coin while the first coin is in said position, a passageway common to all the coins leading from said chute, means for releasing the coin, to enable it to be directed from said position into operative position in the machine, manually actuated coin controlled means for actuating said releasing means and for collecting one or more fares from any particular coin deposited, and a manually actuated setting mechanism for varying the number of fares to be collected.

5. A change making machine comprising a single chute for receiving a deposited coin in position for examination, means controlled by the deposit of said coin to prevent the deposit of a second coin while the first coin is in said position, a passageway common to the different sizes of coins for directing into operative position therein the various coins deposited in the machine, and manually actuated means controlled by the diameter of the coin deposited for collecting a predetermined number of fares therefrom.

6. A change making machine comprising a single chute for receiving a deposited coin in position for examination, means controlled by the deposit of said coin to prevent the deposit of a second coin while the first coin is in said position, a passageway common to the various coins deposited leading from said chute, means for releasing the coin from the position of examination to enable it to be conducted into operative position in the machine, and means for actuating said releasing means and for collecting one or more fares from the different coins deposited, including mechanism for varying the number of fares to be collected from the coins deposited.

7. A change making machine comprising a single chute for receiving the various coins deposited in position for examination, means controlled by the deposit of one coin to prevent the deposit of a second coin while the first coin is in said position, a passageway common to all the coins connected to said chute, means for releasing the coin to enable it to be directed from said position of examination to operative position in the machine, and means common to the different sizes of coins deposited and controlled by the diameter of the same for collecting a predetermined number of fares therefrom.

8. A change making machine comprising a single chute for receiving the deposited coins for examinaton, a passageway leading from said chute and in which the coin is received in operative position therein, manually actuated coin controlled means having a single coin controlled element for collecting a fare from any particular coin deposited, and a manually actuated setting mechanism having a single actuating means for varying and for registering the number of fares to be collected.

9. A change making machine comprising, means for normally ejecting change for or for normally collecting at will one or a plurality of fares from coins of different sizes, a counter, and common means controlled by the aforesaid means for registering on said counter the total number of fares collected by the machine.

10. A change making machine comprising a single chute for receiving the deposited coins for examination, a passageway common to all of the coins leading from said chute to enable a coin to be directed from said chute into operative position in the machine, manually actuated coin controlled means for collecting a predetermined number of fares from any particular coin deposited, and a manually actuated setting mechanism for varying the number of fares to be collected, a hopper for receiving deposited coins, rotatable means for loading a change making receptacle from the hopper in combination with means for utilizing coins deposited for change making.

11. A change making machine comprising a passageway common to the various coins deposited and for receiving the same into operative position in the machine, manually actuated coin controlled means for collecting a predetermined number of fares from the different coins deposited, and setting mechanism for varying the number of fares to be collected from the coins deposited, a hopper for receiving deposited coins, rotatable means for loading a change making receptacle from the hopper in combination with means for utilizing coins deposited for change making.

12. A change making machine comprising a single chute for receiving the deposited coins for examination, a passageway common to all of the coins leading from said chute to enable a coin to be received in operative position in said passageway, a plurality of operating positions in said passageway, manually actuated means having a single element controlled by the diameter of said coins, for collecting a fare from any particular coin deposited, and a manually actuated setting mechanism for varying the number of fares to be collected from any coin, in combination with means for utilizing coins deposited for change making.

13. A change making machine comprising, means for normally ejecting change for or normally collecting at will one or a plurality of fares from deposited coins of different sizes, a counter, and common means controlled by the aforesaid means for registering on said counter the total number of fares collected by the machine, in combination with means for utilizing the deposited coins for change making.

14. A change making machine comprising a common passageway for admitting coins of different denominations into the operative position in the machine, means for containing a plurality of stacks of coins for change making, ejector mechanism for each of said stacks, and means for actuating said ejecting mechanism comprising a movable gauge the throw of which is predetermined by the denomination of the coin admitted to its operative position, an ejector operating member carried by said gauge and movable therewith to operative position, an operating crank, means actuated by the preliminary movement of said crank for moving said gauge and the ejector operating member thereon to operative position and means thereafter actuated by said crank for operating said ejecting member to actuate said ejector mechanism.

15. In a change making machine, a common passageway for admitting coins of different denominations into operative position in the machine, a single coin ejecting mechanism for each denomination of change coin and means common to the coins deposited for actuating said ejecting mechanism including reciprocal means having a given amplitude, and controlled by the denomination of the coin deposited into operative position to vary said movement of the ejector mechanism.

16. In a change making machine, a common passageway for admitting coins of different denominations into operative position in the machine, in combination with means for ejecting an amount of change equal to the difference between the amount of the coin deposited and the fare to be collected comprising means common to the coin deposited and reciprocally movable thru a given distance for actuating said ejecting mechanism and including means variably controlled by and including the different denominations of the coins deposited for varying the movement of the coin ejecting mechanism in accordance with the denominations of said coins.

17. A change making machine, comprising means for receiving coins of different sizes into operative position in the machine, a single change ejector for each denomination of change coin and mechanism common to the coins of different denominations for actuating said ejectors to return change, said mechanism including means operable thru a given amplitude for variably controlling said ejectors in accordance with the particular coin deposited.

18. A change making machine comprising a coin chute into which the coins of different denominations are deposited, means for feeding said coins from said chute into operative position in the machine, a plurality of operative positions, a change ejector common to the said coins of different denominations, means for variably controlling said ejector predetermined by the denomination of coin admitted to return change corresponding to a fixed fare that is charged, and an operating means exterior of the machine common to the different coins deposited for actuating said feeding means, said change ejector and said controlling means.

19. A change making machine comprising a coin chute into which the coins of different denominations are deposited, means for feeding said coins from said chute into operative position in the machine, a plurality of operating positions, a change ejector common to the said coins of different denominations, means for variably controlling said ejector predetermined by the denomination of the coin admitted to return change corresponding to a fixed fare that is charged, and an operating means exterior of the machine common to the different coins deposited for actuating said feeding means, said change ejector and said controlling means, in combination with mechanism for varying the number of fares to be collected and operated by means exterior of the machine and common to the coins of different denomination for returning an amount of change by said ejector in accordance with the number of fares to be collected.

20. A change making machine, comprising a chute adapted to receive coins of different denominations, mechanism common to the coins deposited for automatically feeding the coins into operative position in the machine and normally collecting a single fare therefrom, setting mechanism controlled by a single actuating means exterior to the machine and common to the various coins deposited for enabling a plurality of fares from the coins of higher denomination deposited to be collected therefrom, means for returning change from said coins in accordance with the amount of fares to be collected, means exterior to the machine and common to the various coins deposited for actuating said mechanism and said change return means, and means operated by said actuated means for automatically restoring the setting means to normal position.

21. A change making machine, comprising a chute adapted to receive coins of different denominations, mechanism common to the coins deposited for automatically feeding the coins into operative position in the machine and normally collecting a single fare therefrom, setting mechanism controlled by means exterior to the machine and common to the various coins deposited for enabling a plurality of fares from the coins of higher denomination deposited to be collected therefrom, means for returning change from said coins in accordance with the amount of fares to be collected, means exterior to the machine and common to the various coins deposited for actuating said mechanism and said change return means, means operated by said actuated means for automatically restoring the setting means to normal position, a counter, and means actuated by said exterior means and controlled by said setting means for registering on said counter the number of fares collected by the machine.

22. A change making machine comprising a single chute for receiving the deposited coins for examination, a passageway common to all of the coins leading from said chute to enable a coin to be directed from said chute into operative position in the machine, manually actuated coin controlled means, having a single coin controlled element, for all coins deposited, for collecting a predetermined number of fares from any particular coin deposited, and a manually actuated setting mechanism, having a single actuating means for all the coins deposited, for varying the number of fares to be collected, in combination with means for utilizing coins deposited for change making.

23. A change making machine comprising a single chute for receiving the deposited coins for examination, a passageway common to all of the coins leading from said chute to enable a coin to be received in operative position in said passageway, manually actuated means having a single coin controlled element for all coins deposited and controlled by the diameter of said coins, for collecting a fare from any particular coin deposited, and a manually actuated setting mechanism, having a single actuating means, for varying the number of fares to be collected from any coin, in combination with means for utilizing coins deposited for change making.

24. A change making machine comprising a single chute for receiving the deposited coins for examination, a passageway leading from said chute and in which each coin is received in operative position therein, manually actuated coin controlled means having a single coin controlled element for all the coins deposited, for collecting a fare from any particular coin deposited, and a manually actuated setting mechanism having a single actuating means for varying the number of fares to be collected, and means for utilizing coins deposited for change making.

25. In a change making machine, a common passageway for admitting coins of different denominations into operative position in the machine, a single coin ejecting mechanism for each denomination of change coin and means common to the coins deposited for actuating said ejecting mechanisms including means controlled by the denomination of the coin deposited into operative position and operable thru a cycle of longitudinal and vertical movement to vary the amount of the movement of the ejector mechanisms.

26. A change making machine comprising a single chute for receiving the deposited coins for examination, a passageway leading from said chute and in which the coin is received in operative position therein, manually actuated coin controlled means having a single coin controlled element, for collecting a fare from any particular coin deposited, means for registering the fares collected, and a manually actuated setting mechanism having a single actuating means for varying and for controlling the registering of the number of fares to be collected, in combination with means for utilizing coins deposited for change making.

27. In a change making machine, a common passageway for depositing coins of different denominations into operative position in the machine, a coin ejecting mechanism for each denomination of change coin, and means common to the deposited coins of different denominations for actuating said ejecting mechanism, said means comprising a member reciprocally movable thru a fixed amplitude and controlled by the denomination of the coin deposited whereby to vary the amount of the movement of said ejector mechanism.

28. A change making machine comprising means for receiving coins of different denominations into operative position in the machine, a holder for change coins of the same denomination, means for ejecting change for a deposited coin from said holder, said means comprising a member common to the different denominations of coins deposited and reciprocally movable thru a given amplitude.

29. In a fare collecting and change making machine, means for collecting one or a multiple of fares from deposited coins of different denominations by returning change from said deposited coins in coins of the same denomination, means for registering the fares collected, said collecting means comprising a single member reciprocally movable thru a given amplitude for actuating said registering means.

30. A change making machine comprising means for receiving coins of different denominations, means for ejecting change from the coins deposited in coins of the same denomination, means common to the coins deposited and comprising a member reciprocally movable thru a given amplitude for actuating said ejecting means.

31. In a fare collecting and change making machine, means for depositing coins of different denominations into operative position in the machine, means for ejecting a predetermined amount of change from the coins deposited to collect a fare from said coins, means for registering the fares collected, in combination with means comprising a single member reciprocally movable thru a given amplitude for simultaneously actuating said ejecting means and said registering means.

32. A change making machine comprising a single chute for receiving deposited coins in position for examination, mechanism for arresting said coins in said position, a passageway leading from said chute into which rejected coins are adapted to be discharged, a second passageway leading from said chute into which the genuine coins are adapted to be received into the machine, said arresting mechanism comprising a movable means to enable the spurious coins to be discharged into the first mentioned passageway, and a movable means for enabling the genuine coins to be received into the second mentioned passageway, in combination with means for ejecting change for the deposited coins, comprising means for actuating said last mentioned movable means before said coin ejecting means is operated 33. A change making machine comprising a single chute for receiving deposited coins in position for examination, mechanism for arresting said coins in said position, a passageway leading from said chute into which rejected coins are adapted to be discharged, a second passageway leading from said chute into which the genuine coins are adapted to be received into the machine, said arresting mechanism comprising a movable means to enable the spurious coins to be discharged into the first mentioned passageway, and a movable means for enabling the genuine coins to be received into the second mentioned passageway, means for ejecting change for the deposited coins, comprising, in combination, means actuated by said ejecting means for simultaneously rejecting the coins in said first mentioned passageway and for registering the number of coins rejected.

34. A change making machine comprising a single chute for receiving deposited coins in position for examination, mechanism for arresting said coins in said position, a passageway leading from said chute into which rejected coins are adapted to be discharged, a second passageway leading from said chute into which the genuine coins are adapted to be received into the machine, said arresting mechanism comprising a movable means to enable the spurious coins to be discharged into the first mentioned passageway, and a movable means for enabling the genuine coins to be received into the second mentioned passageway, and means for ejecting change for the deposited coins, comprising, in combination, means for registering spurious coins, a member common to said passageways and constituting an element of said ejecting means for arresting spurious coins in the first mentioned passageway and genuine coins in the second mentioned passageway whereby upon the operation of said ejecting means coins will be simultaneously discharged from said first mentioned passageway and registered.

35. A change making machine comprising a single chute for receiving deposited coins in position for examination, mechanism for arresting said coins in said position, a passageway leading from said chute into which rejected coins are adapted to be discharged, a second passageway leading from said chute into which the genuine coins are adapted to be received into the machine, said arresting mechanism comprising a movable means to enable the spurious coins to be discharged into the first mentioned passageway, and a movable means for enabling the genuine coins to be received into the second mentioned passageway, and means for ejecting change for the deposited coins comprising, in combination, means for registering spurious coins, a member common to said passageways and constituting an element of said ejecting means for arresting spurious coins in the first mentioned passageway and genuine coins in the second mentioned passageway, whereby upon the operation of said ejecting means spurious coins in the first passageway are simultaneously discharged from the machine and registered and genuine coins in the second mentioned passageway are enabled to be received into the machine.

36. A change making machine comprising a chute for receiving deposited coins, a passageway leading from said chute to enable the coins to be received into the machine, a second passageway to enable the return of the coins deposited, and means for ejecting change for the coins received into said first mentioned passageway, in combination with means for arresting the coins in said chute for examination, said arresting means comprising a movable means for enabling the coins to be received into the first mentioned passageway and a second movable means for enabling the coins to be received into said second mentioned passageway, and means actuated by said ejecting means for operating said first mentioned movable means.

37. A change making machine comprising a chute for receiving deposited coins, a passageway leading from said chute to enable the coins to be received into the machine, a second passageway to enable the return of the coins deposited, means for ejecting change for the coins received into said first mentioned passageway, means for arresting the coins in said chute for examination, said arresting means comprising a movable means for enabling the coins to be received into the first mentioned passageway and a second movable means for enabling the coins to be received into said second mentioned passageway, means for automatically operating said first mentioned movable means, and means for operating said second mentioned movable means, in combination with means controlled by the coins in said second mentioned passageway for registering the coins returned therefrom, upon the operation of said ejecting means.

38. A change making machine comprising a chute for receiving deposited coins, a passageway leading from said chute to enable coins to be received into the machine, a second passageway to enable the return of the coins deposited, and means for registering the coins returned, in combination with means for ejecting change for coins received into said first mentioned passageway, said ejecting means comprising means common to said passageways whereby upon the operation of said ejecting means coins in the first mentioned passageway will be received into the machine and coins in said second mentioned passageway will be returned and operate said registering means.

39. A change making machine comprising a chute for receiving deposited coins, a passageway leading from said chute to enable the coins to be received into the machine, a second passageway to enable the return of the coins deposited, means for ejecting change for the coins received into said first mentioned passageway, means for arresting the coins in said chute for examination, said arresting means comprising a movable means for enabling the coins to be received into the first mentioned passageway and a second movable means for enabling the coins to be received into said second mentioned passageway, means actuated by said ejecting means for operating said first mentioned movable means, and means for actuating said second mentioned movable means, in combination with an element which constitutes a part of said ejecting means for arresting spurious coins in the second mentioned passageway and genuine coins in operative position in the first mentioned passageway, and means for registering the number of coins returned when said ejecting means is actuated.

40. A change making machine comprising a chute for receiving deposited coins, a passageway leading from said chute to enable the coins to be received into the machine, a second passageway to enable the return of the coins deposited, and means for ejecting change for the coins received into said first passageway, in combination with means for arresting the coins in said chute for examination, said arresting means comprising a movable means for enabling the coins to be received into the first mentioned passageway and a second movable means for enabling the coins to be received into said second mentioned passageway, means actuated by said ejecting means for operating said first mentioned movable means, a member common to said passageways and constituting a part of said ejecting means for arresting spurious coins in the second mentioned passageway, and genuine coins in operative position in the first mentioned passageway, whereby upon the operation of said ejecting means to discharge the coins in the second passageway from the machine and for releasing the coins in the first mentioned passageway to enable them to be received into the machine, and means actuated by said ejecting means through the intermediary of the coins in the second mentioned passageway to register the number of coins discharged.

41. In a change making machine, means for collecting a predetermined number of fares from deposited coins of different denominations, means for holding a stack of change coins therein, means common to the coins deposited for ejecting change therefor, said means comprising a rotatable turn-stile for ejecting change coin pieces one at a time from said stack of coins, and means for controlling the rotation of said turn-stile in proportion to the number of fares to be collected from the coin deposited.

42. A change making machine, comprising means for collecting fares by ejecting various amounts of change from coins of different denominations deposited therein, mechanism for utilizing certain coins deposited for change making, means for stacking said change coins in operative relationship to said ejecting means, in combination with a receptacle in the machine for receiving said deposited change coins, a tubular member adapted to receive a stack of said change coins, and means for conveying said change coins from said receptacle to said tubular member.

43. In a change making machine, mechanism for utilizing coins deposited for change making, comprising a receptacle in the machine for receiving coins, a tubular member adapted to receive a stack of change coins, and revoluble means for conveying the coins from said receptacle to said tubular member, in combination with means for ejecting one or more change coins from said tubular member whereby to collect fares from the coins deposited.

44. In a change making machine, means for ejecting change from coins of different sizes comprising in combination, mechanism for utilizing coins deposited for change making, said mechanism comprising a receptacle in the machine for receiving coins, a tubular member adapted to receive a stack of coins, and means including an inclined conical or tapering section down which the coins slide and are deposited at an angle in the tubular member for conveying the coins from said receptacle to said member, whereby the coins are properly stacked in cooperative relationship with said ejecting means and from which tubular member said means is adapted to eject change.

45. In a change making machine, means for ejecting change from coins of different sizes comprising in combination, mechanism for utilizing coins deposited for change making, said mechanism comprising a receptacle in the machine for receiving coins, a tubular member provided with an inclined conical or tapering section projecting from the upper portion thereof and adapted to receive a stack of coins, means actuated by said ejecting means for conveying coins from said receptacle to said conical or tapering section from which they fall at an angle into and repose in said tubular member into cooperative relationship with said ejecting means whereby the coins are ejected from said stack upon the operation of said ejecting means.

46. A change making machine comprising means for collecting fares from deposited coins by ejecting change therefrom, in combination with, mechanism for positioning said coins in cooperative relationship with said fare collecting means so as to be ejected for change making, said mechanism comprising a receptacle for receiving change coins, a tubular member in said receptacle adapted to receive a stack of said coins, and means including a rotatable drum for picking up the coins and conveying the same from said receptacle to said tubular member.

47. In a change making machine, means for receiving deposited coins in operative position in the machine and means for ejecting change therefrom, in combination with, mechanism for utilizing deposited coins for change making, said mechanism comprising a receptacle for receiving said coins, a tubular member in said receptacle adapted to receive a stack of said coins, and means including a rotatable drum for repeatedly conveying the coins from said receptacle to said tubular member whereby to keep the latter normally full of coins which are adapted to be ejected as change.

48. In a change making machine, means for ejecting change from coins of different sizes, and mechanism for utilizing deposited coins for change making, said mechanism comprising in combination, a receptacle in the machine for receiving deposited coins, a tubular member adapted to receive a stack of said coins in ejecting position, and means comprising a rotatable drum actuated by the ejecting means for picking up the coins in the receptacle and conveying the same from the receptacle to said stack.

49. In a change making machine, means for ejecting change from deposited coins, comprising in combination, mechanism for utilizing coins deposited for change making, said mechanism comprising, a receptacle in the machine for receiving coins, a tubular member in said receptacle adapted to receive a stack of coins, and means including a rotatable drum for conveying the coins from said receptacle to said member and also including an inclined conical or tapering section, mounted upon said member, down which the coins slide and are deposited at an angle in the tubular member, whereby the coins are properly stacked in cooperative relationship to said ejecting means.

50. In a change making machine, means for ejecting change from deposited coins, comprising in combination, mechanism for utilizing coins deposited for change making, said mechanism comprising, a receptacle supported from a platform in the machine for receiving coins, a tubular member and provided with an inclined conical or tapering section projecting from the upper portion thereof and having its lower end spaced from said platform and adapted to receive a stack of coins, means actuated by said ejecting means for conveying coins from said receptacle to said conical or tapering section from which they fall at an angle into said tubular member to rest upon said platform in cooperative relationship with said ejecting means whereby coins are ejected from said stack by said ejecting means.

51. In a change making machine, means for ejecting change for deposited coins comprising in combination, mechanism for utilizing coins deposited for change making, said mechanism comprising, a receptacle in the machine for receiving coins, a tubular member adapted to receive a stack of coins and hold the same in cooperative relationship with respect to said ejecting means, and means for conveying the coins from said receptacle to said tubular member, said tubular member constituting a part of the receptacle whereby the coins overflowing the former will be redeposited in the latter by said conveying means.

52. A change making machine comprising, means for collecting at will one or a plurality of fares from coins of different sizes, and means for ejecting change therefrom, in combination with mechanism for rejecting spurious coins, means for registering the spurious coins rejected, and means cooperating with the ejecting means for registering the number of spurious coins rejected when said ejecting means is operated.

53. A change making machine comprising, change return mechanism, a single chute for receiving deposited coins for examination, a passageway leading from said chute and common to all of the coins deposited to enable a coin to be received into operative position in the machine, a second passageway leading from said chute and common to all the coins deposited to enable spurious coins to be rejected, means common to said passageways for arresting said coins in said chute and adapted to be actuated automatically to position a coin in operative position in the machine upon the operation of the change return mechanism or to be operated manually to reject the same, and means actuated by said change return mechanism to register the number of coins manually rejected.

54. A change making and fare collecting machine comprising, change return mechanism, and a chute for receiving a deposited coin, in combination with means for actuating said change return mechanism, said change return mechanism comprising means, the normal fixed position of which is adapted to be set to another fixed position to vary the predetermined number of fares normally collecting from deposited coins, and means, automatically actuated as a result of the operation of the machine, for resetting the aforesaid means to its normal fixed position.

55. A change making and fare collecting machine comprising, change return mechanism, and a chute for receiving a deposited coin, in combination with means for actuating said change return mechanism, said change return mechanism comprising a single manually manipulable means, the normal fixed position of which is adapted to be set to another fixed position to vary the predetermined number of fares normally collected from deposited coins, and means, automatically actuated as a result of the operation of the machine, for resetting the aforesaid means to its normal fixed position.

56. A change making and fare collecting machine comprising, change return mechanism, and a chute for receiving a deposited coin, in combination with means for actuating said change return mechanism, said change return mechanism comprising means, the normal fixed position of which is adapted to be set to another fixed position to vary the predetermined number of fares normally collected from deposited coins, means for variably adjusting said aforesaid means to collect a predetermined number of fares in excess of that for which the machine is set to normally collect, and means, automatically actuated as a result of the operation of the machine, for resetting the aforesaid means to the normal fixed position.

57. A change making and fare collecting machine comprising, change return mechanism, and a chute for receiving a deposited coin, in combination with means for actuating said change return mechanism, said change return mechanism comprising means, the normal fixed position of which is adapted to be set to another fixed position to vary the predetermined number of fares normally collected from deposited coins, means for variably adjusting said aforesaid means to collect a predetermined number of fares in excess of that for which the machine is set to normally collect, and means for resetting the mechanism to normally actuate said change return mechanism upon each operation of the machine.

58. A change making machine comprising, means for ejecting the exact change for, or collecting at will one or a plurality of fares from, a deposited coin, said means comprising, coin ejectors, and a single element adapted to be actuated thru different distances to actuate said ejectors to eject different amount amounts of change from the coin deposited, in combination with a manually manipulable means in cooperative relationship with said element to actuate the latter thru different distances upon each operation of said ejecting means.

59. A change making and fare collecting machine comprising, change return mechanism, and a chute for receiving a deposited coin, in combination with means for actuating said change return mechanism, said change return mechanism comprising means, the normal fixed position of which is adapted to be set to another fixed position to vary the predetermined number of fares normally collected from deposited coins, means for variably adjusting said aforesaid means to collect a predetermined number of fares in excess of that for which the machine is set to normally collect, and means interior of the machine for automatically restoring said setting means to normal position.

60. A change making machine comprising means for collecting a predetermined number of fares from coins of different denominations, a plurality of change holders, change return mechanism for each holder and a counter adapted to register the fares collected, in combination with means for actuating said change return mechanisms and means for actuating said register, all of said actuating means being in juxtaposition and adapted to be selectively operated by a single coin controlled operation means.

In testimony whereof, I have hereunto set my hand this 18th day of March, 1924.

CHARLES E. CHALMERS.

CERTIFICATE OF CORRECTION.

Patent No. 1,801,797. Granted April 21, 1931, to

CHARLES E. CHALMERS.

It is hereby certified that error appears in the printed specification of the above numbered patent requiring correction as follows: Page 7, line 49, for "stud" read stub; page 9, line 70, for "213" read 215; page 11, line 28, claim 8, for the misspelled word "examinaton" read examination; same page, lines 128 and 129, claim 15, for the words "vary said movement of the" read vary the movement of said; page 16, line 113, claim 54, for "collecting" read collected; page 17, line 17, claim 56, for the article "the" read said, and line 18, for "the" read its; same page, line 42, claim 58, strike out the word "amount"; and that the said Letters Patent should be read with these corrections therein that the same may conform to the record of the case in the Patent Office.

Signed and sealed this 1st day of September, A. D. 1931.

(Seal)
M. J. Moore,
Acting Commissioner of Patents.